June 23, 1964   L. T. WARD   3,138,301
METERING BUTTON CAP FOR USE WITH PRESSURIZED CONTAINERS
Filed Sept. 27, 1961   6 Sheets-Sheet 1
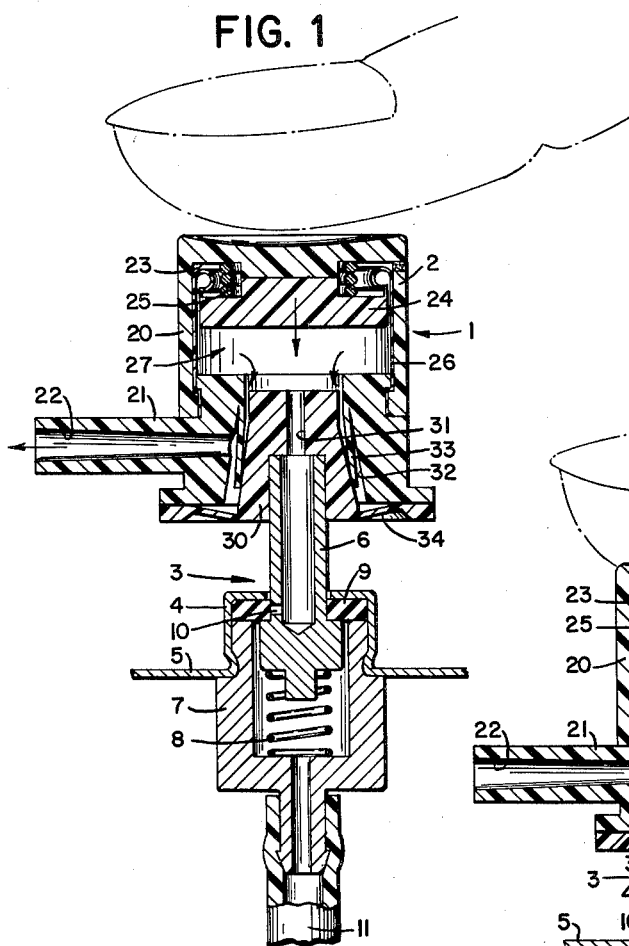
FIG. 1
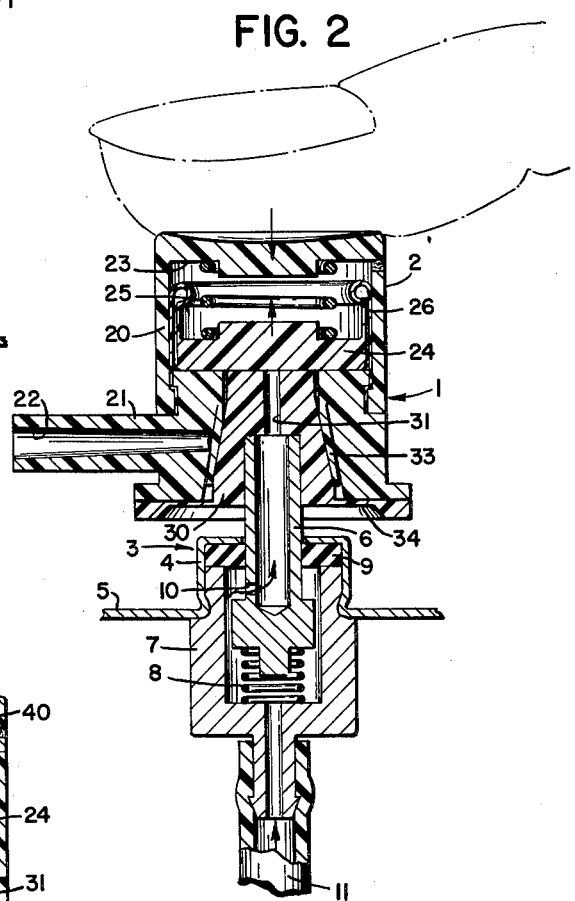
FIG. 2
FIG. 3
INVENTOR
LAWRENCE T. WARD
BY
ATTORNEYS June 23, 1964     L. T. WARD     3,138,301
METERING BUTTON CAP FOR USE WITH PRESSURIZED CONTAINERS
Filed Sept. 27, 1961     6 Sheets-Sheet 2

INVENTOR
Lawrence T. Ward
BY
ATTORNEYS

June 23, 1964   L. T. WARD   3,138,301
METERING BUTTON CAP FOR USE WITH PRESSURIZED CONTAINERS
Filed Sept. 27, 1961   6 Sheets-Sheet 3

INVENTOR
Lawrence T. Ward
BY
ATTORNEYS

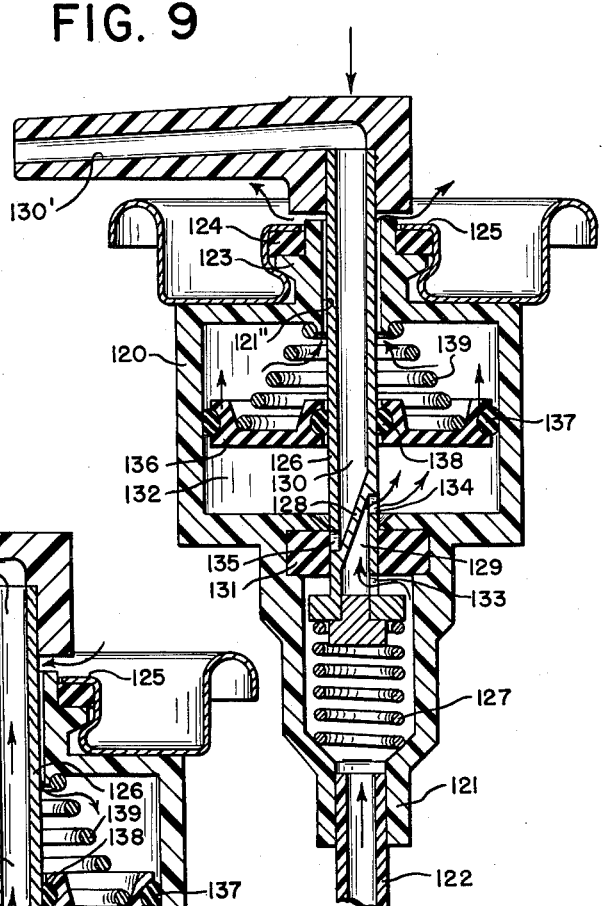
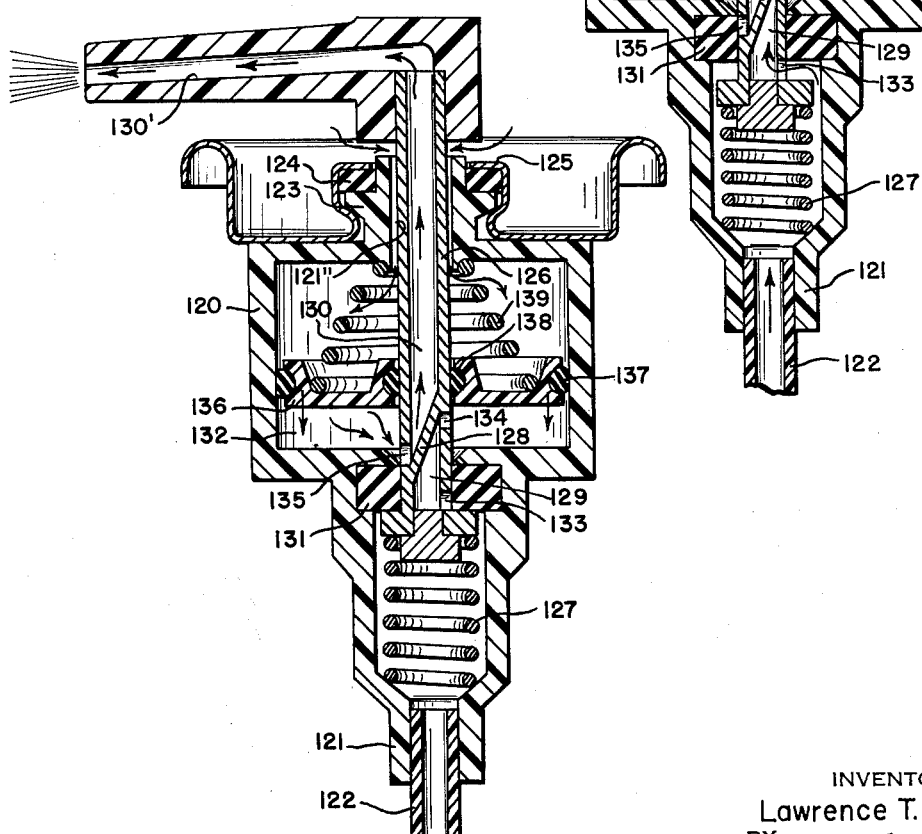

INVENTOR
Lawrence T. Ward
BY
ATTORNEYS

June 23, 1964 L. T. WARD 3,138,301
METERING BUTTON CAP FOR USE WITH PRESSURIZED CONTAINERS
Filed Sept. 27, 1961 6 Sheets-Sheet 6

INVENTOR
Lawrence T. Ward
BY
ATTORNEYS

United States Patent Office 3,138,301
Patented June 23, 1964

3,138,301
METERING BUTTON CAP FOR USE WITH
PRESSURIZED CONTAINERS
Lawrence T. Ward, Portland, Pa., assignor to Seary Ltd., Canton of Zug, Switzerland
Filed Sept. 27, 1961, Ser. No. 141,077
7 Claims. (Cl. 222—335)

This invention relates to a metering button cap and more particularly to a metering button cap for use with pressurized containers having a gaseous propellant and having conventional hollow stem depressible type discharge valves. This application is a continuation-in-part of application Serial No. 115,776, filed by me on June 8, 1961, now abandoned.

Metering valve assemblies have heretofore been used with aerosol type containers wherein the propellant is soluble in the goods to be propelled or ejected from the container. Containers filled with goods, such as deodorant, perfume, etc., have used Freon as a propellant or other derivatives of fluorine which are readily soluble in the goods to be ejected and which are ejected along with the goods in order to aerate them. Freon or other fluorine derivative propellants, however, are often unsuitable for use with many goods, such as food products, medicinal products, or in instances where fluorine may be toxic to the user. Another propellant used has been carbon dioxide which, while not toxic, often reacts with food products to vary their taste. It is desirable, therefore, that a relatively inert propellant be used which is not toxic and which will not react with the goods to be ejected from the container. Such an inert propellant which is adaptable for use in pressurized containers is nitrogen oxide where it will not react with the product to be propelled. This propellant is for the most part relatively insoluble in the goods to be ejected from the container and are used essentially as a pressure source to push the goods from the container up through a syphon tube into a discharge valve.

It is often desirable that a predetermined amount of goods be ejected from a pressurized container upon each application of the discharge valve. This is particularly true wherein the goods are to be mixed with a liquid in order to make a flavored beverage of constant strength or, where medicinal products are used and uniform dosage is desired. It is therefore an object of this invention to provide for a metered button valve assembly which may be used to accurately meter goods ejected from a pressurized container having a relatively non-soluble gaseous propellant.

A desirable feature of metered valve assemblies is that the assembly itself be made of a minimum number of parts and wherein the parts will require a minimum of machining in order to reduce expense of manufacture. I propose to provide for a metering button cap which has a minimum of parts most of which may be easily molded on an injection molding machine. Further I propose to provide for a button cap which may be applied to conventional continuous flow valves to convert them into metered valve assemblies. By making a metering button cap according to my novel design, the cap itself may be used over and over again merely by taking the cap off the discharge valve of an empty container and applying it to the discharge valve of a filled container.

Further, it is often desirable that the exact amount metered from the valve assembly upon each actuation of the valve be varied. I propose to provide in a preferable form of my invention regulating means whereby the exact amount metered from a pressurized container may be easily and accurately varied.

Still another feature which is important in the manufacture of metered valve assemblies is that the assembly itself not interfere with filling of the container. A metering button cap constructed according to my invention is applied to a conventional continuous flow valve to convert it to a metered valve assembly after the container has been filled through the discharge valve and thus the metering button cap itself does not interfere with filling.

A metering button cap constructed according to one form of my invention is adapted to be used with a conventional continuous flow valve having a hollow depressible operable valve stem which is resiliently biased outwardly from a valve housing. The valve housing is carried in a neck portion of a pressurized container having an aperture through which the depressible stem may be moved. The depressible stem sealingly engages the sides of the aperture and has therein an opening which is normally sealed off by the sides of the aperture and which will be open when the valve stem is depressed to connect the interior of the container with the interior of the hollow valve stem.

The novel button cap assembly, which is applied to the end of the valve stem, comprises generally a cup-shaped body portion having a recess therein of predetermined size to form a metering chamber. The button cap has a discharge passage extending therethrough which is adapted to connect the chamber with atmosphere. The button cap contains means whereby the discharge passage may be closed when the body portion is depressed in order to depress the hollow valve stem. A plunger is movably mounted in the recess so as to form a side wall of the chamber and is biased by resilient means so that under normal conditions, when the opening in the hollow stem is sealed by the side walls of the aperture, the plunger will be urged outwardly of the chamber. As the button cap is depressed and the opening of the valve stem brought into communiaction with the interior of the container, the non-soluble gaseous propellant in the container will force the goods up through the valve housing, the valve stem, into the metering chamber contained in the button cap where the pressure of the goods will move the plunger into the button cap against the force of the resilient means. As the operating force is removed from the valve assembly so that the valve stem is moved outwardly of the container by its resilient means to close the opening in the valve stem, the discharge passage in the button cap will be caused to open so that the goods in the metering chamber may be ejected through the discharge passage by the force of the resilient means urging the plunger outwardly of the chamber. In a different form of the invention, I include means whereby the stroke of the plunger may be varied so as to effectively vary the capacity of the metering chamber and thus the amount of the goods which may be metered.

A further form of my invention has a valve adjacent the exit of the discharge passage or outlet nozzle which extends through the button cap so that goods remaining inside the button cap will not become contaminated or dried out after first use of the metering valve assembly.

This embodiment of my invention comprises broadly a button cap having a hollow body portion with a discharge passage extending through the body portion. The passage has a valve seat at its outer end and a valve plunger movable in the passage to engage the seat to seal off the interior of the body portion from the atmosphere. The other end of the valve plunger is connected to a resilient flexible diaphragm which forms a part of the top of the body portion. A piston is included in the body portion and is spring biased so that it is urged into the body portion. When the button cap constructed according to this form of the invention is depressed by finger pressure, the valve stem will move as in the other forms of the invention to allow goods to flow into the hollow body portion where they will force the piston outwardly against the force of the spring. Release of finger pressure will allow the diaphragm to move which in turn will cause the plunger to unseat from the valve seat so that the goods may be expelled out of the discharge passage by the force of the spring urging the piston inwardly of the body portion. After the goods are ejected, the resilient diaphragm will return to its normal shape and move the plunger into sealing engagement with the valve seat.

Still another form of my invention utilizes molded parts which are so designed that the valve in the discharge passage will be self-cleaning and so that the metering chamber will be subjected to a sweeping action as the goods pass out the button cap. The valve comprises a flexible sleeve or lip molded to one of the two molded parts making up the button cap and which is spread by a tapered insert which is a part of the other molded part when the two parts are forced together by a finger pressure. The spread sleeve will then seal off the discharge passage.

Referring to the drawings in which preferred embodiments of my invention are illustrated, FIG. 1 is a cross-sectional view of a button cap constructed according to my invention shown applied to a conventional discharge valve after an operating force has been removed and wherein the goods are being ejected out the discharge passage of the button cap;

FIG. 2 is a cross-sectional view similar to FIG. 1 showing an operating force being applied to depress the hollow valve stem and showing goods flowing from the interior of the pressurized container into the button cap;

FIG. 3 is a cross-sectional view of a different embodiment of the button cap illustrating means for varying the amount of goods metered by the valve assembly;

FIG. 8 is a cross-sectional view of a cap for use with a modified discharge valve;

FIG. 9 is a cross-sectional view similar to FIG. 8 showing the button cap depressed;

Figure 5:
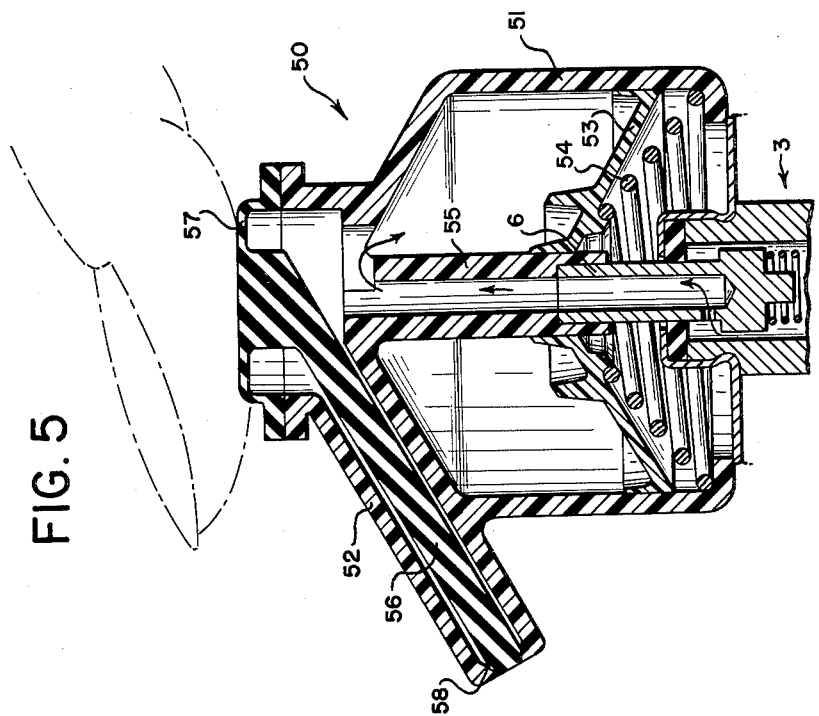
FIG. 5 is a view similar to FIG. 4 illustrating the button cap depressed and goods entering into the cap.

Referring to the drawings in greater detail and in particular to FIGS. 1 and 2, 1 denotes generally a metered button valve assembly comprising a button cap 2 applied to a conventional continuous flow discharge valve denoted generally by 3 mounted in a neck 4 of a pressurized container 5.

The discharge valve 3 comprises a hollow depressible valve stem 6 which is urged outwardly of a valve housing 7 by means of a spring 8. A gasket 9 sealingly engages the outer side walls of the stem 6 and bears on the top portion of the valve housing to provide a fluid-tight seal. A port opening 10 extending through the stem 6 is normally sealed by the gasket 9 and communicates with the interior of the valve housing 7 when the stem 6 is moved inwardly of the container against the force of the spring 8. When opening 10 is unsealed, the gaseous propellant, which is contained in the container 5, will exert a pressure to force goods contained in the container up through syphon tube 11 into the housing 7, through the opening 10, and into the interior of the stem 6. The continuous flow discharge valve described is of conventional design.

The button cap 2 comprises a cup-like body portion 20 which has a bottom portion 21 sealed to its lower inner periphery. Bottom portion 21 in turn has a discharge passage 22 which extends through its side walls and through which the goods are ejected to atmosphere. A recess 23 is formed in the body portion 20 and has therein a plunger 24 which is urged outwardly of the recess by means of a spring 25. The plunger 24 forms a seal with the side walls of the recess 23 by means of an envelope-type seal 26 so that a pressure or metering chamber 27 is formed therein. The plunger 24 thus forms a side wall of metering chamber 27.

An insert 30 or valve stem engaging portion is sealingly mounted on the outer end of stem 6 and has therein a connecting passage 31 which connects the interior of stem 6 with the chamber 27. The bottom portion 21 has a tapered aperture 32 extending therethrough with a flexible sleeve 33 adjoining to the narrow end of the tapered aperture. Insert 30 has a corresponding taper so that as the bottom portion is moved towards the insert, it will cause the sleeve 33 to spread and thus close the opening of discharge passage 22. In addition, the insert has a flexible diaphragm 34 integral therewith and which is sealed to the outer periphery of the bottom portion so that when the spray orifice is open, goods contained in the pressure chamber 27 will be forced around the free end of the sleeve out through the discharge passage under the force of spring 25.

The operation of the device is as follows: The container is initially filled by attaching the depressible stem 6 to a convention filling machine. When the stem is depressed, opening 10 is unsealed so that goods and propellant may be forced down into the container from the filling machine. After the container is filled and the filling machine disconnected, the stem is moved upward by spring 8 so closing opening 10 to seal the propellant and goods in the container. My novel button cap is then applied to the end of the stem so that it is sealed with the insert 30.

Referring to FIG. 2, as the button cap 2 is depressed by finger pressure, body portion 20 will move towards insert 30 so that the sleeve 33 will be caused to spread to seal or close off the discharge passage 22. Further depression of the button cap will then cause the insert and stem 6 to move downwardly to allow goods under the force of a non-soluble propellant to be forced up through the syphon tube, valve housing, and into the interior of the stem and connecting passage 31. The pressure exerted by the gaseous propellant on the goods will then cause the plunger 24 to move inwardly in the body portion 20 against the force of the spring 25 until the plunger reaches the limit of its vertical travel and the metering chamber is filled. As finger pressure is released from the button cap, spring 8 will move the stem 6 upward to seal the opening 10. The plunger 24 will then move down under the force of the spring 25 to cause the goods in the metering chamber to flow around the lower edge of sleeve 33 and so pass out the discharge passage 22. After the container has been completely exhausted, the metering button cap may be reused on a fresh container.

The metering chamber is placed above the discharge passage so that when the button cap is released, the plunger will produce a sweeping action to completely eliminate the contents from the metering chamber which in turn will tend to reduce any entrapment of goods in the button cap which would cause subsequent dripping. Further, the use of the tapered insert with the sleeve as shown assures positive closing of the discharge passage when the cap is depressed while at the same time giving rigidity to the button cap. The various parts comprising the button cap, with the exception of spring 25, may be easily molded from polyethylene or other moldable material. Use of the envelope seal 26 and of the sleeve 33 eliminates the necessity for parts to be machined so reducing cost of manufacture of the button cap.

Reference is made to FIG. 3 which illustrates a different embodiment of my invention whereby the capacity of the metering chamber may be readily varied. In the button cap there illustrated, the body portion 40 has extending therethrough a screw 41 which is threaded into insert 42 carried by the body portion. By varying the setting of screw 41, the stroke of plunger 24 may be varied so that the capacity of the metering chamber of which the plunger forms a side wall, is likewise varied. In all other respects, the button cap there shown is similar to that shown in FIGS. 1 and 2 and operates the same.

Figure 4:
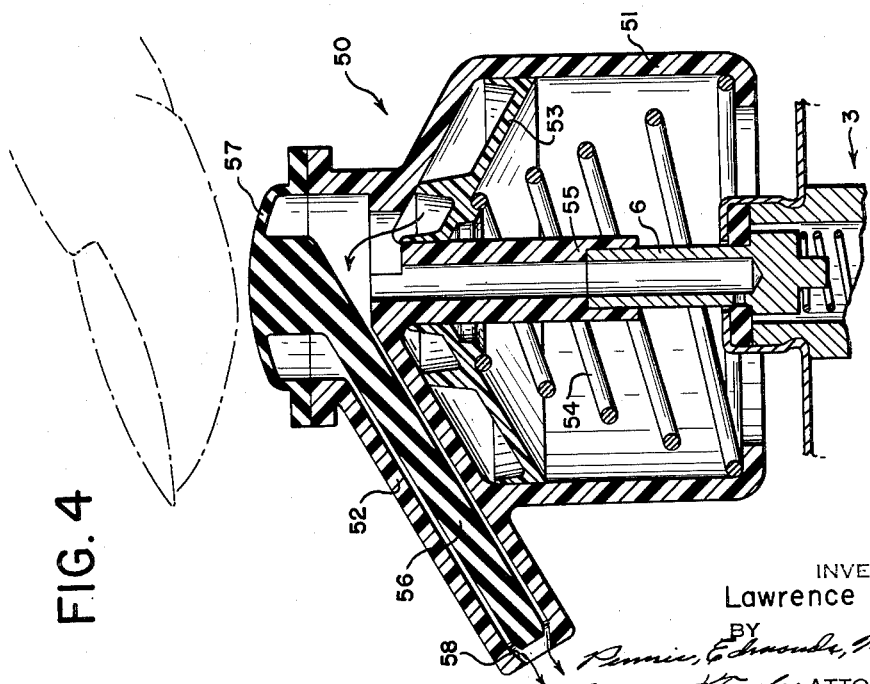
FIG. 4 is a cross-sectional view of an embodiment of the invention having valve means at the outer end of the discharge passage.

Referring to FIGS. 4 and 5, there is illustrated a button cap 50 having particular use with goods which become spoiled or contiminated upon contact with the atmosphere or which may dry and clog up the button cap. The cap 50 comprises a body portion 51, a discharge nozzle 52, a piston 53, and a spring 54 which urges the piston upward into the body portion.

The body portion has a tubular element 55 which may engage the valve stem 6 of a conventional discharge valve 3. The nozzle 52 has a valve plunger 56 which is movable in the nozzle and which is integral with a resilient, flexible diaphragm mounted on the top of the body portion. The outer end of the plunger normally seats on a valve seat 58 mounted at the end of nozzle 52 when the diaphragm is in a neutral position to close off the discharge passage contained in the nozzle from atmosphere.

As the button cap is depressed as shown in FIG. 5, the goods will flow up the stem 6 into the body portion. The pressure of the goods entering into the body portion will force the piston 53 downwardly against spring 54.

As finger pressure is released as shown in FIG. 4, a diaphragm 57 will expand outwardly under the pressure of the goods caused by spring 54 pushing on piston 53. This outward movement of the diaphragm in turn will move plunger 56 to cause it to unseal with seat 58 so opening the discharge passage. After the goods have been ejected from the cap, the resilient diaphragm will return to normal wherein the plunger will again seat on the valve seat 58.

Figure 6:
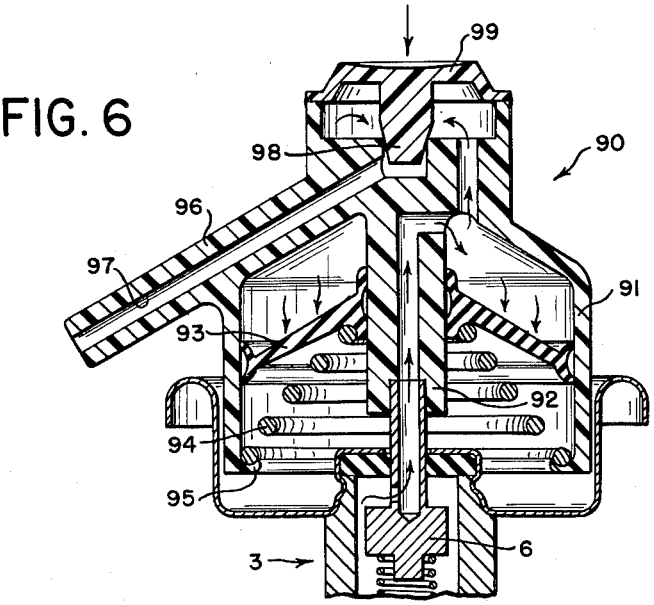
FIG. 6 is a cross-sectional view of a cap slightly different from that shown in FIG. 4 in that a valve means is located at the inner end of the discharge passage.

Reference is made to FIGURE 6 in which is illustrated a button cap generally similar to that shown in FIGURE 4 with the exception that the discharge passage contained in the discharge nozzle has a valve at its inner end. The button cap denoted generally by numeral 90 comprises a body portion 91 having a stem receiving portion 92 integral therewith which engages the depressible valve stem 6 of a conventional discharge valve similar to that shown in FIG. 1. A piston 93 is urged inwardly of the body portion by spring 94 which bears upon a flange 95 integral with the bottom of the body portion. The discharge nozzle 96 has therein a discharge passage 97 which is adapted to be closed by the valve portion 98 which is integral with a flexible diaphragm 99, which in turn is joined to the top of the body portion 91. The principle of operation of the button cap 90 is the same as that shown in FIGS. 4 and 5.

Figure 7:
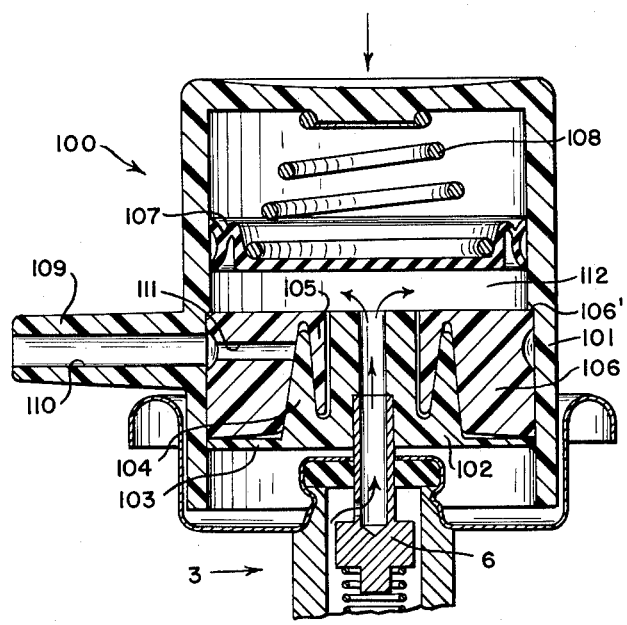
FIG. 7 is a cross-sectional view of a cap having a different valve means in the discharge passage.

In FIG. 7 there is illustrated a button cap 100 comprising a body portion 101 which has a stem engaging portion 102 which in turn is joined to the body portion 101 by a weld or other means. The stem engaging portion 102 has joined to the bottom thereof a flexible diaphragm 103 having an upwardly tapered portion 104 which cooperates with a downwardly tapered portion 105 contained on an insert 106. Insert 106 is held against a shoulder 106' in the body portion by means of the diaphragm 103. A piston 107 is urged downwardly by a spring 108 positioned between the piston and the inner part of portion 101. A discharge nozzle 109 which has a discharge passage 110 therein in turn communicates with passage 111 contained in the insert 106.

As the portion 101 is depressed by finger pressure which in turn will depress the stem 6, the goods in the container will force up into the metering chamber 112 and so force the piston 106 in an upward direction to compress the spring 108. As finger pressure is released, the flexible diaphragm 103 will expand outwardly under the pressure of the goods contained in the metering chamber 112 to cause the tapered portions 105 and 104 to move axially away from each other which in turn will allow flow of goods around the tapered portions out through the passages 111 and 110. After the spring 108 ejects the goods from the metering chamber 112, the flexible diaphragm 103 will move tapered portions 104 and 105 towards each other to again seal the inner opening of the passage 111 and thus prevent accumulation of goods within the passages around the tapered portions comprising the seal.

FIGURE 8 illustrates a metering discharge valve for use with an insoluble propellant wherein the complete valve assembly is contained within the pressurized container. The valve there illustrated comprises a valve housing 120 having at the bottom thereof a siphon tube receiving section 121 through which a siphon tube 122 may extend. The top of the housing 120 has a shoulder 123 which supports a seal 124 over which a portion 125 of the container is turned to seal the housing with respect to the container. A hollow depressible valve stem 126 extends through the valve housing and is biased upwardly by means of a spring 127. An inner wall 128 of the valve stem separates the stem into a lower segment 129 and an upper segment 130. A seal 131 grips the side walls of the stem and separates the interior of the pressurized container from the interior of the valve housing comprising the metering chamber 132. The stem 130 has two ports 133 and 134 in the lower segment thereof so positioned that the bottom port 133 is closed by the seal 131 when the stem is in its upper or normal position. A third port 135 is contained in the stem above separating wall 128 and is so positioned that when the stem is depressed, it will be closed by seal 131. One side wall of the metering chamber 132 comprises a movable piston 136 having O-ring seals 137 and 138 which is biased downwardly by means of a spring 139. In addition, the housing 121 has a vent 121" cut in the upper portion of the housing in order to provide an air passage to the space behind piston 136.

The operation of the device shown in FIGS. 8 and 9 is as follows. As the valve stem is depressed as shown in FIG. 9, the goods in the container will be forced up the siphon tube 122 into the portion of the housing containing spring 127. The goods will then flow through the port 133 into the lower segment of the stem and out through the port 134 into the metering chamber where the piston 136 will be moved in an upward direction against the force of the spring 139. When the outside force is released as shown in FIG. 8, spring 127 will move the stem 130 in an upward direction so closing port 133 while opening port 135. The spring 139 will then force the goods in the metering chamber outwardly through the port 135 and so out the upper segment of the stem 130 out through the discharge nozzle 130'.

Figure 10:
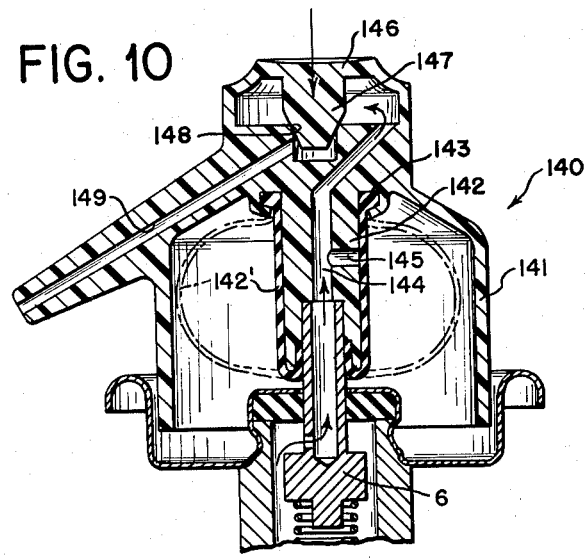
FIG. 10 is a cross-sectional view of a cap having a rubber sac for a metering chamber.
Figure 11:
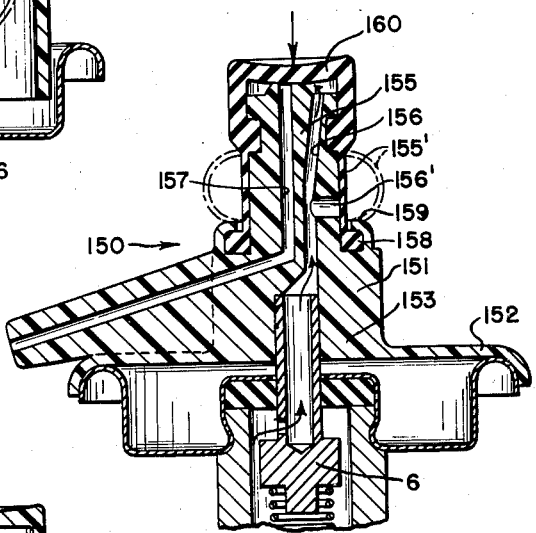
FIG. 11 is a cross-sectional view of a two piece cap having a molded rubber sac for a metering chamber.
Figure 12:
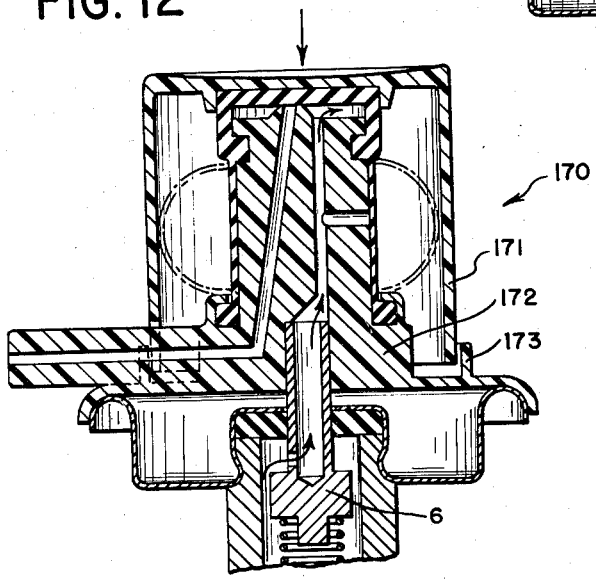
FIG. 12 is a cross-sectional view of a three piece cap slightly different from that shown in FIG. 10 and having a molded rubber sac as a metering chamber.

Reference is now made to FIGS. 10, 11, and 12, where the valves there shown utilize molded rubber sacs to provide the force necessary to expel goods from a button cap when an insoluble propellant is utilized. In FIG.

10 the cap 140 comprises a body portion 141 which has a stem engaging portion 142 which in turn is adapted to contact a stem of a conventional discharge valve. The portion 142 has surrounding it a molded rubber expansible sac 142' which engages with the stem of a discharge valve to form a seal therewith and which is held to the body portion 141 by means of shoulders 143. The portion 142 has therein an axially extending passage 144 and a laterally extending passage 145 which connects with the interior of the rubber sac. The upper part of the button cap comprises a flexible diaphragm 146 which has thereon a valve portion 147 which in turn seats with the valve seat 148 placed at one end of the discharge passage 149.

The device shown in FIG. 10 operates in a manner similar to that shown in FIGS. 1–9. Upon the depression by finger pressure of the button cap, the valve portion 147 is seated with valve seat 148 to first close off the discharge passage 149. Further application of finger pressure will depress the valve stem 6 to allow the goods to be forced into the passage 144 and passage 145 to cause the rubber sac to expand. Release of finger pressure will allow the valve stem 6 to rise and thus shut off the flow of goods into the button cap and the diaphragm 146 will cause the valve 147 to unseat from the valve seat 148. The elasticity of the rubber sac will then force the goods contained therein out through the passages 144 and 149.

FIG. 11 illustrates a construction generally similar to that shown in FIG. 10 with the exception that it only comprises two pieces. There the button cap 150 comprises a body portion 151 having a lower flexible shoulder portion 152 which is sealingly connected with a pressurized container. The body portion has a stem receiving section 153 which is adopted to engage with the stem of a conventional discharge valve. The upper part of the body portion 151 comprises a sac receiving section 155 about which is placed an expansible rubber sac 155'. The section 155 has therein two vertically extending passages 156 and 157 which serve as intake and discharge passages respectively. The lower part of the rubber sac has a rolled up section 158 which is held to the body portion 151 by means of a turned over portion 159 while the upper portion of the sac comprises a flexible diaphragm 160 which engages with the inner part of passage 157 to serve as a valve therefor. A horizontally extending passage 156' connects with passage 156 and with the inner part of the rubber sac so that when the button cap is depressed by finger pressure, goods will flow therethrough to cause the rubber sac to expand.

The operation of the valve shown in FIG. 11 is such that when finger pressure is initially applied to the diaphragm 160, it will cause the passage 157 to be closed. Further depression of the cap will move the whole cap body downward since the lower portion is flexible to allow depression of the valve stem associated with a conventional discharge valve. The goods will then flow into the passage 156 and passage 156 expanding the rubber sac. Withdrawal of finger pressure will allow the cap and stem 6 to move upwardly while at the same time resiliency of the diaphragm 160 will open the inner end of the passage 157 thus allowing goods to be forced out thereof under the force of the resilient rubber sac.

The button cap 170 construction illustrated in FIG. 12 is generally similar to that shown in FIG. 11 with the exception that a protective cover 171 is provided in order to protect the molded rubber sac. In addition, the body portion 172 of the button cap differs from that shown in FIG. 11 in that an annular ring 173 is provided in which the protective cover 171 may slide and be guided. In essentially all other respects the structure of the cap assembly there shown is similar to that in FIG. 11 and the principal operation is the same.

Figure 13:
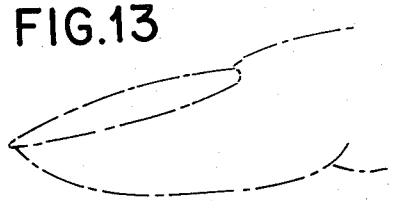
FIG. 13 is a cross-sectional view of a button cap for use with a soluble propellant which has a self-cleaning valve in the discharge passage.
Figure 14:
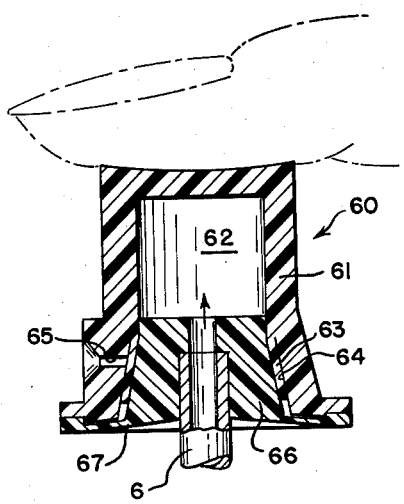
FIG. 14 is a view similar to FIG. 13 showing the button cap depressed.

FIGS. 13 and 14 illustrate a button cap 60 for use with a soluble gaseous propellant where the goods are discharged through a discharge passage which comprises only two molded parts. The upper part 61 has a metering chamber 62 therein with an expansible sleeve portion 63 which depends into tapered cutout 64 in the lower portion of the upper part. A discharge passage in the form of a spray orifice 65 extends through the upper part.

The lower part comprises a tapered insert 66 which is adapted to sealingly engage the stem 6 of a conventional discharge valve assembly and which extends up into the expansible sleeve of the upper part. The lower portion of the lower part has a resilient, flexible diaphragm 67 integral therewith which is heat sealed to the upper part.

The strength or flexure of the diaphragm 67 is such that the insert 66 will normally be in the position as shown in FIG. 14 whereby the sleeve 63 is spread to seal off passage 65. When the cap is depressed by finger pressure to depress stem 6, goods will flow under the pressure of the soluble gas containing the goods into the metering chamber 62. As finger pressure is released and stem 6 rises to cut off flow of goods into the metering chamber, the pressure of the goods in the metering chamber will cause the upper part to move relative to the lower part and so withdraw the insert from the sleeve thus unsealing the passage at the same time the goods will flow between the lower edge of the sleeve and insert into a space between the diaphragm and upper part to expand the diaphragm outwardly all as shown in FIG. 13. After the goods have been discharged, the resilient diaphragm will again return the two parts to the normal position as shown in FIG. 13.

The configuration of the sleeve and insert helps assure complete sweeping of the goods from the metering chamber and contributes to a self-cleaning action of the parts. In particular, the sleeve 63, which performs the valve function in the discharge passage, serves to scrape off any residue of goods which might remain and harden.

Figure 15:
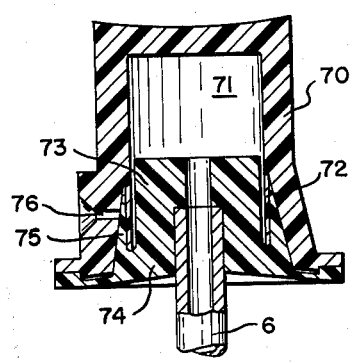
FIG. 15 is a cross-sectional view of a slightly different embodiment of the button cap from that shown in FIGS. 13 and 14 in that it has a modified valve in the discharge passage.

Referring to FIG. 15, there is illustrated another form of the invention generally similar to that which is shown in FIGS. 13 and 14 except that the lower molded part also carried a flexible lip or sleeve portion in addition to the expansible sleeve portion on the upper molded part. The cap there illustrated comprises an upper molded part 70 having therein a metering chamber 71. A thin flexible sleeve 72 depends from a portion of 70 and is adapted to be pressed inwardly to seal against the side walls of an insert 73 contained on a lower molded part 74. The lower part has an upwardly extending lip 75 which is tapered also and which extends between the side wall of part 70 and the lip 72. A discharge passage 76 is sealed by the lip 75 being forced against it. This is caused by the pressure of insert 73 pressing on sleeve 72 when parts 70 and 74 are brought together. In all other respects, the cap shown in FIG. 8 works in the same manner as that shown in FIGS. 13 and 14.

Figure 16:
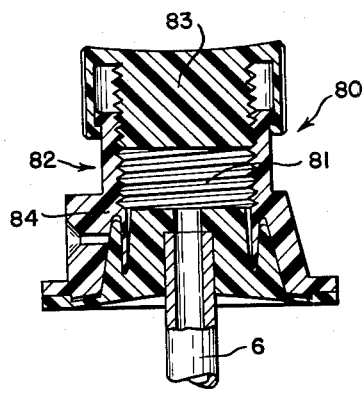
FIG. 16 is a cross-sectional view of a button cap similar to that shown in FIG. 13 with additional means for varying the size of the metering chamber.

FIG. 16 illustrates a cap 80 having a variable metering chamber 81. The upper molded part 82 comprises in turn two separate parts which consist of a threaded plug 83 which is severed into a threaded insert 84 whereby the metering chamber may be varied in size.

Having described my invention what I claim is:

1. A metering outlet valve assembly for a pressurized container utilizing a non-soluble gaseous propellant for ejecting goods from the container through an outlet aperture, comprising in combination: a hollow depressible operating valve stem resiliently biased outwardly from the container with the outer wall of the stem sealingly and slidably engaging the sides of the aperture and having an opening extending through the outer wall where the opening is movable inwardly from sealing engagement with the sides of the aperture to connect the interior of the container with the interior of the stem; and, a button cap mounted exterior of the container in sealing engagement around the outer end of the stem where the button cap has a chamber of predetermined size therein connectable with the interior of said stem, a discharge passage extending through said cap to connect the exterior of said cap with said chamber, a movable side wall in said chamber, resilient means urging said side wall to move in one direction, and valve means operable by depression of said cap for closing off said discharge passage before said stem is depressed and before said opening is brought in communication with the interior of said container; said movable side wall being moved against the force of said resilient means by the force of the non-soluble gaseous propellant when the stem is depressed and said side wall being moved in the direction of the force of said resilient means as said stem rises to force goods out of said chamber through said discharge passage.

2. A metering outlet valve assembly according to claim 1 wherein said cap has therein variable stop means for varying the limit of movement of said movable wall of said chamber in order to vary the amount of goods metered by said assembly.

3. A metering button cap for use with a pressurized container utilizing a non-soluble gaseous propellant and which is adapted to sealingly and operatively engage the outer end of a hollow depressible valve stem of a continuous flow valve placed in the container, said button cap having therein a chamber of predetermined size, a valve stem engaging portion having a connecting passage therein leading to said chamber and adapted to sealingly engage the exterior of a hollow stem to connect the interior thereof with said chamber, a discharge passage extending through said cap into said chamber adapted to connect said chamber with atmosphere, movable plunger means in said chamber, resilient means urging said plunger means to move in one direction, and closure means carried in said cap operable by depression of said cap for closing off said discharge passage from said chamber.

4. A button cap according to claim 3 wherein said chamber has a variable stop means to limit the stroke of said plunger.

5. A metering button cap for use with a hollow depressible valve stem of a discharge valve mounted in a pressurized container, said button cap comprising: a body portion having a cylindrical recess therein, a bottom portion in sealing contact with the bottom of said body portion, a tapered aperture in said bottom portion, a spray orifice extending through said bottom portion into said tapered aperture, a flexible cylindrical sleeve in said tapered aperture joined to said bottom portion at the narrow end of said aperture and adapted to be spread to close off said spray orifice, a tapered insert adapted to be in sealing contact with a hollow valve stem of a discharge valve, a connecting passage in said insert adapted to connect said recess with the interior of the hollow valve stem, a diaphragm portion on said insert portion in sealing contact with the bottom of said bottom portion, and a plunger sealingly engaging the side walls of said recess and resiliently urged outwardly of said recess by spring means; said sleeve portion being spread by said tapered insert to close off said spray orifice when said body portion is moved towards said insert, said plunger being movable inwardly of said recess by pressure in said container when said hollow valve stem is depressed, and said plunger being movable outwardly of said recess by the force of said spring means when said spray orifice is opened.

6. A metering button cap to sealingly and operatively engage a depressible hollow valve stem of a pressurized container comprising: a cup-shaped body having therein a recess of predetermined size, a bottom portion in sealing contact with the open end of said cup-shaped body having a spray orifice extending therethrough adapted to be in communication with said recess, a tapered aperture in said bottom portion having a flexible cylindrical sleeve joined at the narrow end of said aperture adapted to shut off said spray orifice, a tapered insert adapted to sealingly engage a depressible hollow valve stem, said insert being movable with respect to said cup-shaped body and extending into said sleeve, a flexible diaphragm sealing the bottom of said bottom portion, and a plunger in sealing contact with the side walls of said recess urged outwardly of said recess by spring means; said sleeve portion being spread by said tapered insert to close off said spray orifice when said cup-shaped body is moved towards said insert.

7. A metering button cap for use with a hollow depressible valve stem of a discharge valve mounted on a pressurized container, said cap comprising: a body portion having a metering chamber therein, a discharge passage extending through said body portion into said chamber, flexible expansible sleeve means for sealing off said discharge passage, insert means for expanding said sleeve to seal off said discharge passage, and a resilient flexible diaphragm connecting said insert means to said body portion; said diaphragm under force of pressure in said chamber moving from a normal position to cause said insert to move relative to said sleeve to unseal said passage and the resiliency of said diaphragm returning it to said normal position whereby said passage is sealed by said sleeve.

References Cited in the file of this patent

UNITED STATES PATENTS

| | | |
|---|---|---|
| 2,070,167 | Iddings | Sept. 23, 1932 |
| 2,673,012 | Harrington | Mar. 23, 1954 |
| 2,746,796 | St. Germain | May 22, 1956 |
| 2,892,576 | Ward | June 20, 1959 |
| 2,953,284 | Prussin et al. | Sept. 20, 1960 |
| 3,003,662 | Meshberg | Oct. 10, 1961 |
| 3,018,928 | Meshberg | Jan. 30, 1962 |
| 3,043,484 | Jolly | July 10, 1962 |
| 3,052,382 | Gawthorp | Sept. 4, 1962 |

OTHER REFERENCES

Pressurized Packaging (Aerosols); page 76, table 27; Butterworths Scientific Publications, 1958.

Modern Packaging: Article entitled "The Status of Food Aerosols," page 123, left column, lines 14–20, February 1961.